Figure 1:
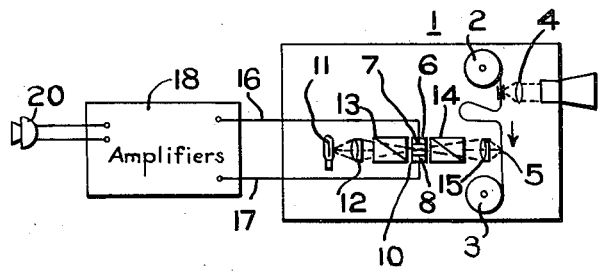

April 2, 1935.  V. K. ZWORYKIN  1,996,449

RECORDING SYSTEM

Filed July 15, 1927

INVENTOR
Vladimir K. Zworykin.
BY
ATTORNEY

UNITED STATES PATENT OFFICE 1,996,449

RECORDING SYSTEM

Vladimir K. Zworykin, Swissvale, Pa., assignor to Westinghouse Electric & Manufacturing Company, a corporation of Pennsylvania Application July 15, 1927, Serial No. 205,940

2 Claims. (Cl. 179—100.3)

My invention relates to recording systems, and it has particular relation to systems designed for the simultaneous recording of both sound and pictures, of the type commonly known as "talking movies".

During the process of filming the usual motion pictures, it is often necessary to re-adjust the positions of the various cameras with reference to the scene being filmed. Occasional "close-ups", or enlarged detail views, are often desirable, and, at other times, it is better to have the camera at a considerable distance from the scene in order that a wide angle of vision may be included.

When, however, the apparatus for the recording of sounds is mounted in the camera, as is necessarily the case when the sound and pictures are recorded on the same film, it is practically impossible to change the position of the camera while the picture is being made, since such changes would materially interfere with the recording of the sounds.

It is accordingly an object of my invention to provide a recording system adapted to the making of "talking movies" wherein there is no necessity for disturbing the fixed position of the cameras during the recording operation.

Another object of my invention is to provide a system of the type described wherein the sound recording may be accomplished by a plurality of simultaneously operable devices with the full assurance that the sound records so made will be identical and that the will be substantially free from distortion.

Another object of my invention is to provide, in a system of the type described, potentially operated sound-recording devices that absorb substantially no energy, and which may, accordingly, be multiplied to any desired degree in order that any required number of sound records may be simultaneously made without placing an excessive demand upon the sound-energy source.

Still another, and more specific, object of my invention is to provide, in a system of the type described, means whereby a plurality of photographs of a scene may be taken from different positions, means adjacent said photographing means for picking up the sounds, as heard from the several positions, together with appropriate circuit connections and switching devices for selecting the appropriate sound source for recording purposes.

In order that the above objects may be attained, I have made use of a sound-recording system in which the sound fluctuations are amplified by an audio-frequency amplifier and are impressed as electrostatic field variations across the electrodes of a plurality of Kerr cells, or analogous potentially operated devices. The amplifier is energized from a plurality of microphones which are distributed at appropriate points over the program area occupied by the scene being photographed, the said microphones being either connected in parallel thereto or being selectively associated therewith by an appropriate switching arrangement.

Among the features that I consider characteristic of my invention, are those set forth with particularity in the appended claims. The invention itself, however, both as to its organization and its method of operation, together with further objects and advantages thereof, will best be understood by reference to the following description of a specific embodiment, taken in connection with the accompanying drawing, in which:

Figure 1 is a conventionalized view of a portion of a system arranged according to my invention, illustrating the manner in which the sound is amplified and is applied to a Kerr-cell recording device associated with a moving-picture camera of the usual type.

Referring specifically to Fig. 1, a moving-picture camera 1, comprising a plurality of film magazines 2 and 3 and a system of lenses 4 for recording the scene on the moving film 5, is further provided with a sound-recording device comprising a Kerr cell 6. The Kerr cell comprises a plurality of electrodes 7 and 8 immersed in a receptacle 10 containing a dielectric material, such as nitro-benzol or the like. Light from a source 11 is so focused, by means of a lens 12, that it passes successively through a Nicol prism or polarizer 13, between the electrodes 7 and 8 of the Kerr cell, through a second Nicol prism or analyzer 14 and a concentrating lens 15 and then impinges on the film 5 at a point where the film travels at a constant speed.

The electrodes of the Kerr cell are connected by means of conductors 16 and 17, respectively, to the output circuit of an amplifier 18 which is energized by a microphone 20.

The amplifier 18 may be of any desired type, as, for example, the type customarily used in radio receiving equipment, in which a plurality of thermionic tubes are employed.

Figure 2:
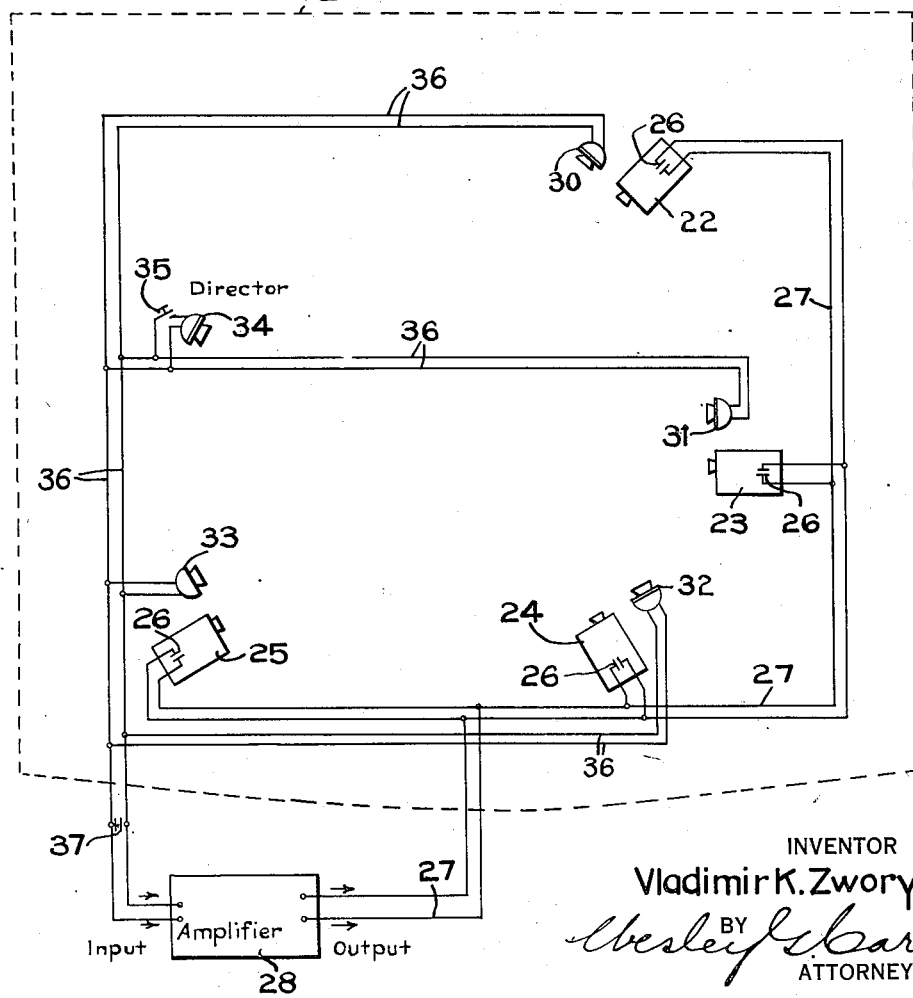

In Fig. 2, an area in which a program is being given, is indicated by a dotted line 21. The area may be either an indoor stage or it may be the "location" where a portion of a scenario is being photographed.

A plurality of cameras 22, 23, 24, and 25 are distributed over the area in proper predetermined positions and are arranged to photograph, from differing angles, the scene being enacted. Although not shown on the drawing, certain of the cameras may be much closer to the scene than others, thus being adapted to produce the "close-up" views previously referred to, while other cameras may be located at distant points and arranged to record what may properly be termed "bird's eye views" of the scene. The "close-up" views may, if preferred, be obtained with cameras located near the edge of the program area, by equipping such cameras with lenses adapted to produce tele-photo effects.

Each of the cameras is equipped with a sound-recording device 26 of the type illustrated in detail in Fig. 1, all of said recording devices being connected in parallel to the output terminals of an amplifying device 28 by means of a plurality of conductors 27.

A plurality of microphones 30, 31, 32, 33, and 34 are distributed at strategic points around the program area, the microphones 30, 31, 32 and 33 being located adjacent to the cameras 22, 23, 24 and 25, respectively. These microphones may have differing characteristics.

The microphone 34 is arranged adjacent to the position being occupied by the director of the scene and is preferably equipped with a manually operable switch 35 in order that its inclusion in the general microphone network may be optional on the part of the director. As illustrated, the microphone 34 is at a point in the area 21 remote from the cameras, but it may, if desired, be located outside the area 21, and frequently would be located in the rear of one of the cameras, out of the field of view thereof. The microphone 34 is for the purpose of permitting the director or an announcer to interject such explanatory remarks as may be necessary for the proper understanding of the film when it is reproduced later in a theater.

The microphone 34 may, of course, be replaced by a plurality of microphones interconnected through a lockout device (not shown) whereby the director, as he moves from place to place, may record the explanatory remarks. In such an event, the energizing of any one of the microphones by the director would cause the actuation of mechanism (not shown) whereby the remaining microphones would be temporarily deenergized or disconnected during the said explanatory remarks.

All of the microphones are connected in parallel to the input terminals of the amplifying device 28 by means of a plurality of conductors 36. It is, of course, feasible to interpose a selective switch mechanism (not shown) between the various microphones and the amplifying device, whereby any desired microphone may be utilized to control the sound record being made by all of the cameras.

It is also feasible to arrange the output circuit of the amplifier with an appropriate switch-device (not shown) whereby any desired number of the sound-recording devices 26 may be actuated simultaneously, to the exclusion of the remaining devices.

According to the preferred mode of operation of my invention, all of the microphones are simultaneously energized from a battery 37 or other potential source to simultaneously control the amplifier. The output from the amplifier 28 is simultaneously impressed upon all of the sound-recording devices carried by the several cameras.

The scene, as the action progresses, is thus simultaneously photographed from a plurality of angles and distances and the sounds produced in the program area are simultaneously recorded on the respective films.

If it is desired, therefore, to break the continuity of the scene being photographed from any one camera by the insertion of a portion of the scene, as taken from another angle or from a closer or more distant position, there is no interruption in the continuity of the recorded sounds. It is entirely feasible to utilize the sound record on any given film for the printing of the final positive of the film designed for commercial reproduction in moving-picture theaters. The picture record may be taken from any of the several films produced by the various cameras, with the full assurance that in the final product, perfect synchronism will exist between the said pictures and the recorded sounds.

It is also feasible, by actuation of the selective-switch device referred to previously, to have the intensity of the sound record increase or diminish, according to the position from which the picture is being taken. In other words, a "close-up" view of the actors may be accompanied by an amplified sound record while the so-called "bird's-eye view" may be accompanied by a sound record much less distinct. To accomplish this purpose, I have shown the respective microphones as closely associated with certain of the cameras, thus being adapted to record the sounds as heard at the points where the said cameras are located.

By proper operation of the selective switch device referred to previously, the amplifier may, for example, be energized only by the microphones which are associated with the "close-up" cameras or may be energized only by the microphones adjacent to the cameras which are being utilized for the "distant" views. Inasmuch as switch-means may also be provided for selectively energizing the sound-recording devices from the amplifier, I am enabled to place the aforementioned "close-up" or "distant" sound record on the appropriate films, to the exclusion of the films in the cameras at other positions.

My recording system is thus extremely flexible in its operation. The Kerr cells, being potentially operated devices, do not cause an appreciable drain on the amplifier. The number of such cells may be almost indefinitely multiplied, since the inter-electrode capacity of each individual cell is extremely minute, being of the order of .0001, it would require a very large number of these cells in parallel to give rise to a capacity sufficient to offer a relatively low impedance to currents at frequencies lying within the audio range.

It is thus possible to utilize as many cameras equipped with Kerr-cell recording devices as may be necessary to properly photograph a scene of substantially any size, without running the risk of having the sounds distorted in the process of recording.

The sounds originating at any given position in the scene may be either recorded by the camera or cameras close to the point of origin or may be recorded simultaneously by all of the cameras. In other words, I have provided a system wherein there is no necessity for continual readjustment of the position of the several cameras, with their accompanying sound-recording devices, and one wherein the sound record is continuous, irrespective of which portions of the many films are utilized in printing the final positive.

Other advantages of my invention, as well as many modifications thereof will be plainly apparent to those skilled in the art. My invention, therefore, is not to be limited, except insofar as necessitated by the prior art and by the spirit of the appended claims.

I claim as my invention:

1. In a recording system, a plurality of microphones, said microphones having different characteristics and spaced apart and being connected in parallel, an amplifier, said microphones being connected to the input circuit of said amplifier, and means for recording sound comprising a light source, a pair of light polarizing devices, a Kerr-cell between said devices and a record, said Kerr-cell being connected to the output of said amplifier.

2. In a recording system, a plurality of microphones of different characteristics connected in parallel, an amplifier, all of said microphones being connected to the input circuit of said amplifier, and means for recording sound including a potentially operated Kerr-cell connected to the output circuit of said amplifier.

VLADIMIR K. ZWORYKIN.